US006442487B2

(12) United States Patent
Kim

(10) Patent No.: US 6,442,487 B2
(45) Date of Patent: Aug. 27, 2002

(54) RELIABILITY MEASURES FOR STATISTICAL PREDICTION OF GEOPHYSICAL AND GEOLOGICAL PARAMETERS IN GEOPHYSICAL PROSPECTING

(75) Inventor: Chul-Sung Kim, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 100 days.

(21) Appl. No.: 09/729,576

(22) Filed: Dec. 4, 2000

Related U.S. Application Data

(60) Provisional application No. 60/169,168, filed on Dec. 6, 1999.

(51) Int. Cl.[7] ............................... G01V 1/50
(52) U.S. Cl. ....................................... 702/6
(58) Field of Search ................ 702/6, 11, 12, 702/13, 14; 703/10, 5, 2; 367/73

(56) References Cited

PUBLICATIONS

Bandemer, Hans; "Specifying Inaccuracy And Uncertainty In Evaluating Functional Relationships", Proc. Polish Symp. Poznan, Sep. 4–7, 1986, pp. 25–31.
Nguyen, Hung T. et al.; "On Dynamics of Cautious Belief And Conditional Objects", Int'l Journal of Approximate Reasoning, 1993; 8:89–104.
Almond, Russell G.; "Fusion And Propagation In Graphical Belief Models", America Statistical Assoc., 1988; pp. 365–370.
Tritchler, David et al.; "Modelling The Reliability Of Paired Comparisons", Journal of Mathematical Psychology 35, 1991; pp. 277–293.

Delgado, M. et al.; "Reliability Concepts Under The Theory Of Evidence", European Journal Of Operational Research 35, 1988; pp. 89–97.
Horiuchi, Takahiko; "A New Theory Of Evidence For Non-–Exclusive Elementary Propositions", International Journal Of Systems Science, vol. 27 #10; 1996; pp. 989–994.
Chang, Yang–Chi et al, "Evidential Reasoning For Assessing Enviromental Impact", Civil. Eng. Syst., vol. 14, 1996, pp. 55–77.
Sudkamp, Thomas, "The Consistency Of Dempster–Shafer Updating", International Journal Of Approximate Reasoning, 1992, 7:19–44.
Kearfott, R. Baker, "Interval Arithmetic Techniques In The Computational Solution Of Nonlinear Systems Of Equations: Introduction, Examples, and Comparisons", Lectures In Applied Mathematics vol. 26, 1990, pp. 337–357.

(List continued on next page.)

Primary Examiner—Donald E. McElheny, Jr.
(74) Attorney, Agent, or Firm—Charles R. Schweppe

(57) ABSTRACT

A method for assessing reliability of a prediction model constructed from N training data attribute vectors and N associated observed values of a specified parameter. Each training data attribute vector includes seismic attributes obtained from seismic data traces located at or near a well and each associated observed value is obtained from well log or core data from the well. A predicted value of the specified parameter is determined for each of the N training data attribute vectors, from the training data attribute vectors and the prediction model. A residual is determined for each of the N training data attribute vectors, as the difference between the associated observed value and the predicted value of the specified parameter for the training data attribute vector. An attribute vector for the designated location is determined.

13 Claims, 5 Drawing Sheets

OTHER PUBLICATIONS

Smets, Phillip, "Belief Functions: The Disjunctive Rule Of Combination And The Generalized Bayesian Theorem", International Journal of Approximate Reasoning, 1993; 9:1–35.

Gebhardt, Jorg et al, "The Context Model: An Integrating View Of Vagueness And Uncertainty", International Journal of Approximate Reasoning, 1993; 9:283–314.

Guan, J. W. et al, "Approximate Reasoning And Evidence Theory", Information Sciences 96, 1997; pp. 207–235.

Langewisch, Andrew et al, "Stochastic Dominance Tests For Ranking Alternatives Under Ambiguity", European Journal of Operational Research 95, 1996; pp. 139–154.

Kozin, Igor O., "Ananolgical Reasoning For Reliability Analysis Based On Generic Data", Reliability Engineering And System Safety 54, 1996; pp. 59–64.

Smets, Phillip et al, "The Transferable Belief Model", Artificial Intelligence 66, 1994; pp. 191–234.

Pinz, Axel et al, "Active Fusion—A New Method Applied To Remote Sensing Image Interpretation", Pattern Recognition Letters 17, 1996; pp. 1349–1359.

RELIABILITY MEASURES FOR STATISTICAL PREDICTION OF GEOPHYSICAL AND GEOLOGICAL PARAMETERS IN GEOPHYSICAL PROSPECTING

This application claims the benefit of U.S. Provisional Application No. 60/169,168 filed on Dec. 6, 1999.

FIELD OF THE INVENTION

This invention relates generally to the field of statistical prediction models used in geophysical prospecting. In particular, the invention relates to a method for assessing reliability of predicted values for geophysical or geological parameters from statistical predictive models used in geophysical prospecting.

BACKGROUND OF THE INVENTION

In the ongoing search for subsurface hydrocarbons, geophysicists have developed methods for evaluating and interpreting the structure and characteristics of the subsurface formations of the earth. One such method is the analysis of seismic data traces. Of particular importance to geophysicists is the ascertainment of formation structure and characteristics consistent with the presence of hydrocarbon deposits.

The seismic data traces that are analyzed using the method of the present invention are obtained by any conventional means. One of ordinary skill in the art would understand that seismic data traces are usually obtained by the reflection of acoustic waves from geologic layers of differing acoustic impedance. Acoustic impedance is dictated by the physical properties of the material through which the acoustic wave travels. Such properties include lithology, porosity, and fluid content.

Seismic data are generally obtained by imparting seismic energy into the earth, then receiving and recording the energy reflected by the subsurface formations. This received energy is then processed to produce seismic signals or traces, which depict reflection information as a function of the time lapse from signal generation to reception and the embedded seismic pulse. As is known to those of ordinary skill in the art, processing of seismic data may vary, but typically includes stacking, migration, and deconvolution.

Originally, seismic data traces were used simply for ascertaining formation structure. However, exploration geophysicists have developed a number of methods to obtain a variety of characteristics that describe the seismic data traces. Such characteristics are termed attributes. These attributes provide quantitative measures of the shape of the seismic data traces. Attributes are said to be instantaneous when values for the attributes are obtained for each data point (i.e., each time sample) or within a small time window of data points. Examples include amplitude, phase, frequency, dip, and power. Attributes are said to be interval, when values for the attributes are taken from a specified seismic interval within a seismic trace. Examples include averages, maximums, and cycle widths of measured characteristics of the seismic signal over the seismic interval.

The objectives of seismic attribute analysis include identifying the boundaries of geologic intervals of differing acoustic impedance and assigning characteristic values, which may exhibit lateral variations, for the physical rock properties within each of these geologic intervals. There are two key steps used in the art to assign these characteristic values for the physical rock properties. The first step is a seismic-to-synthetic well tie, which compares the seismic signal shapes and attributes identified on at least one seismic data trace at or near a well location with those identified in a synthetic seismogram which is developed for that well. The well being used is termed a calibration well. This synthetic seismogram is generated using well data such as well log data or core data, coupled with standard techniques familiar to those skilled in the art. The second step is termed seismic attribute calibration, which involves statistically relating the attributes obtained from seismic data traces that are presumed to represent the formation properties at a well for any seismic interval, with the measured rock properties in that well over that same interval. Thus, a seismic-to-synthetic well tie relates a real seismic data trace to a synthetic seismogram, while calibration relates a real seismic data trace to actual rock properties as determined by the well data, such as well log or core data.

In seismic attribute calibration, a statistical prediction model is used to investigate a relationship between observable seismic attribute variables and a variable representing a geological or geophysical rock property. This involves establishing a predictive relationship between the independent variables observed at densely distributed seismic locations and the dependent variable of interest observed at typically more sparsely distributed well locations. The statistical prediction model may be linear regression or any other statistical technique. This relationship may then be used to predict the variable of interest at locations away from the wells by using the observed seismic attributes.

Suppose the relationship between the rock property variable and attribute variables can be described by a statistical prediction model. In general, let z be the dependent variable of interest and let x represent the independent variables as an attribute vector. It is assumed that z and x are related by a functional relationship, $z=f(x)$. A statistical prediction model represents the relationship as $\hat{z}=\hat{f}(x)$, where $\hat{f}$ is an estimating function for the prediction model and $\hat{z}$ is the predicted value for a given attribute vector x. This relationship will be illustrated using a multiple linear regression model, although the present invention applies to any statistical prediction technique. In a multiple linear regression model, the dependent variable z is represented as a linear combination of the independent attribute vector x:

$$z = a^T x + b + e. \tag{1}$$

Here a is a vector of linear coefficients, b is an intercept, and e is a model or observation error. The superscript T represents the transpose of a vector.

For a set of N training data points, $(x_i, z_i)$, $i=1, \ldots, N$, of independent attribute vectors $x_i$ and dependent variable $z_i$, the classical regression approach uses a least squares criteria to estimate the linear coefficients a and b. This yields a prediction model:

$$\hat{z} = \hat{a}^T x + \hat{b}, \tag{2}$$

where $\hat{z}$ is the predicted value for attribute x, and $\hat{a}$ and $\hat{b}$ are prediction coefficients.

Reliability measures of statistical prediction models such as confidence intervals can be calculated only when certain statistical assumptions are imposed on the training data, which are rarely met in real situations. If the expected value of the error term e of equation (1) is zero, then the prediction coefficients a and b of prediction equation (2) are unbiased estimates of the linear coefficients a and b of equation (1). This assumption also implies that the underlying relationship between the variables x and z in equation (1) is linear.

In this case, the predicted value $\hat{z}$ is an unbiased estimate of z. However, if this linear assumption does not hold, then the predicted value $\hat{z}$ becomes a biased estimate of z. There are cases where the physical relationship between the dependent variable and the independent variables supports a linear regression model. In these cases, it would be useful to have statistical confidence intervals for the predicted value $\hat{z}$ in prediction equation (2). A confidence interval gives upper and lower bounds between which there is a given probability, say 95%, of finding the variable. However, obtaining these confidence intervals requires that the errors that populate the error term e in equation (1) be normally distributed, have constant variance, and be statistically independent of one another. These conditions are rarely met in practical data analysis situations, and the confidence intervals computed from a multiple linear regression model will usually give false information. The confidence intervals associated with multiple linear regression analysis are valid measures for assessing the reliability of predicted values only when linearity and the above statistical assumptions are met.

Similarly, for a predictive neural network, such as a back-propagation neural network, no standard method for determining reliability exists. Thus, there exists a general need for quantifying the reliability of predicted values from statistical prediction models without the strict assumptions needed in classical confidence interval calculations.

SUMMARY OF THE INVENTION

The present invention is a method for assessing the reliability associated with a statistical prediction of a specified geological or geophysical parameter at a designated location. The statistical prediction is obtained from a prediction model constructed from a set of N training data points. Each training data point comprises a training data attribute vector and an associated observed value of the specified geological or geophysical parameter. Further, each training data attribute vector includes one or more seismic attributes obtained from seismic data traces located at or near a well and each associated observed value of the specified parameter is obtained from well log or core data from that well. First, a residual is determined for each of the training data points. The residual is the difference between the associated observed value of the specified parameter for the training data point and a predicted value of the specified parameter for the training data point obtained from the prediction model. Next, an attribute vector is determined for the designated location. Next, a predicted value of the specified parameter at the designated location is obtained using the attribute vector for the designated location and the prediction model. Next, N basic probability distributions are determined from the N training data attribute vectors, the N associated observed values, the N residuals, and the predicted value of the specified parameter at the designated location. Next, N basic probability assignments are determined for each of three hypotheses that the predicted value of the specified parameter at the designated location is reliable, unreliable, and unpredictable, respectably, from the N basic probability distributions. Finally, reliability, unreliability, and unpredictability values for the predicted value of the specified parameter at the designated location are determined as combinations of the N basic probability assignments for each of the hypotheses that the predicted value of the specified parameter at the designated location is reliable, unreliable, and unpredictable, respectively.

BRIEF DESCRIPTION OF THE DRAWINGS

The present invention and its advantages may be more easily understood by reference to the following detailed description and the attached drawings in which.

Figure 1:
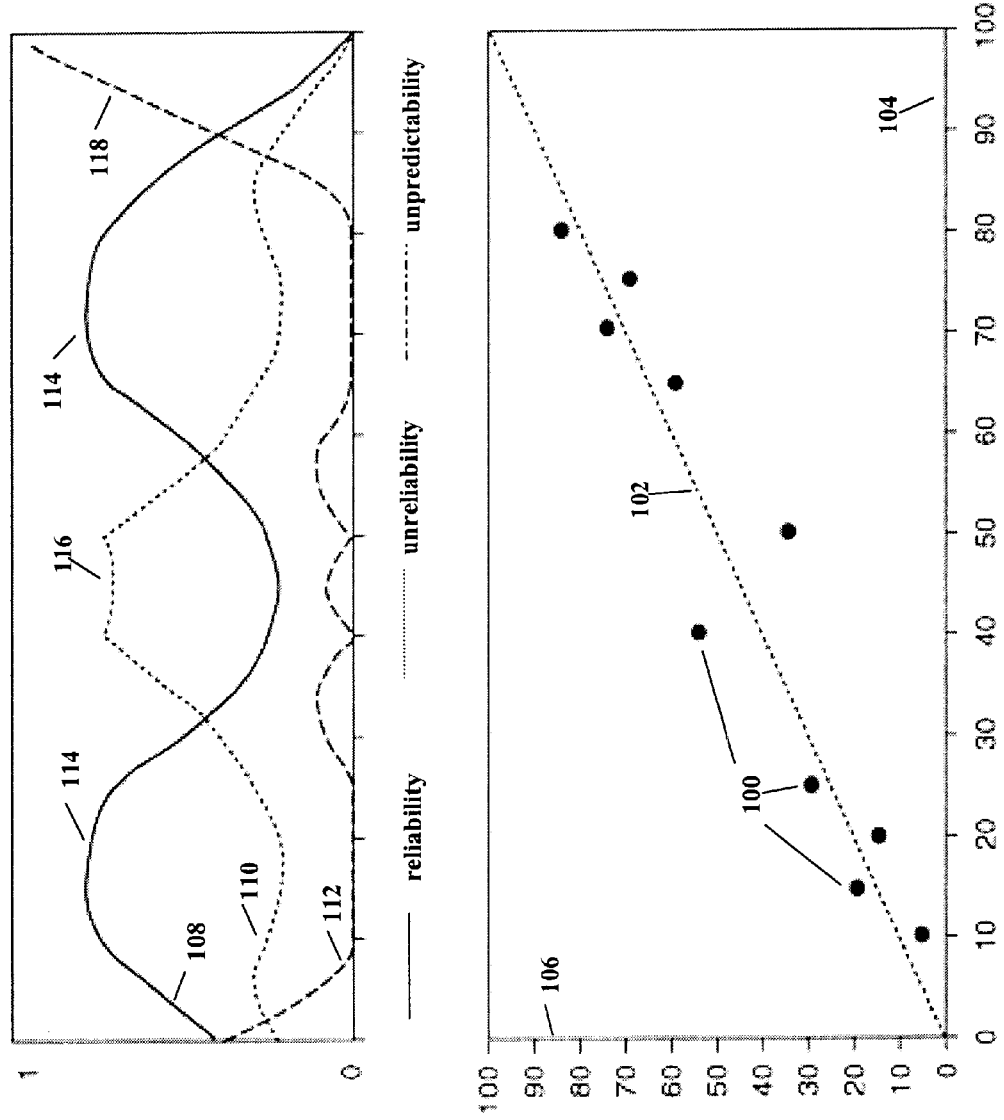
FIG. 1 shows the three reliability measures (reliability, unreliability and unpredictability) for a linear prediction from ten hypothetical training data points, in which the attribute vector consists of only one element.

While the invention will be described in connection with its preferred embodiments, it will be understood that the invention is not limited to these embodiments. On the contrary, it is intended to cover all alternatives, modifications and equivalents that may be included within the scope of the invention, as defined by the appended claims.

DETAILED DESCRIPTION OF THE PREFERRED EMBODIMENTS

The present invention relates to a method for assessing reliability of predicted values of geologic or geophysical parameters from statistical predictive models used in geophysical prospecting. These predictive models could include multiple linear regression and neural networks, but are not restricted to them. The reliability analysis method of the present invention is model free, that is, independent of the predictive model used. The method of the present invention derives reliability measures directly from the topology of the training data points and the predicted values, instead of the residual statistics at the training data points and the predicted values. Therefore, the method is free from assumptions on the form of the residual statistics or the linearity of the underlying predictive model. Although the method of the present invention applies to any statistical prediction model, it will be illustrated using a multiple regression model.

Consider the case of N training data points $(x_i, z_i)$, $i=1, \ldots, N$, with a multiple regression function $\hat{z}=f(x)$, in which $\hat{z}$ is a predicted value of z for an attribute vector x. A residual $r_i$ at the $i^{th}$ training point $(x_i, z_i)$ is defined by:

$$r_i = z_i - \hat{z}_i, \qquad (3)$$

for $i=1, \ldots, N$. In the method of the present invention, a linear relationship between x and z is not assumed. Instead, the reliability of a predicted value $\hat{z}$ is assessed solely based on the N training data points and the residual values observed at the training data points. For a predicted value $\hat{z}$, if the attribute vector x is dissimilar from all the training data attribute vectors, $x_i$, $i=1, \ldots, N$, then there may not be enough information available to judge if $\hat{z}$ is correct or incorrect. This situation is labeled as a prediction $\hat{z}$ with high unpredictability. On the other hand, reliability of a predicted value $\hat{z}$ will be high if its attribute vector x is close to some of the training data attribute vectors and the corresponding residuals $r_i$ at the neighboring $x_i$ are small. This is the case of a prediction $\hat{z}$ with high reliability. If an attribute vector x is close to some of the training data attribute vectors, but the residuals at these neighboring attribute vectors are large, it is highly probable that predicted value $\hat{z}$ will be incorrect. This is the case of a prediction $\hat{z}$ with high unreliability. The above described reliability measures are useful in assessing reliability associated with a predicted value, but these measures are nonetheless qualitative. In the method of the present invention, a mathematical model that quantifies these reliability measures is described.

To test the validity of a predicted value $\hat{z}$ relative to the magnitude of prediction error tolerable, as given by a parameter $\gamma$, an approach in classical probability theory may start with two hypotheses:

$$H_0: |r|=|z-\hat{z}|\leq\gamma, \qquad (4a)$$

and $$H_1: |r|=|z-\hat{z}|>\gamma. \qquad (4b)$$

Here, the residual r is defined as in residual equation (3) by $r=z-\hat{z}$. Reliability equation (4a) represents the hypothesis Ho that the prediction residual is less than or equal to the prediction error limit $\gamma$, while unreliability equation (4b) represents the hypothesis H. that the prediction residual is greater than $\gamma$. Hypothesis $H_0$ is related to a notion of reliability of the predicted value $\hat{z}$, while hypothesis $H_1$ is related to a notion of unreliability of the predicted value $\hat{z}$. In equations (4a) and (4b), the parameter $\gamma$ must be appropriately determined, as will be further described later.

In conventional probability theory, the probability of each hypothesis is calculated based on the residual statistics. In turn, the residual statistics are computed from the residuals observed at the training data points. In this prior art approach, all residuals participate equally in computing residual statistics. Conventional residual statistics computation is based on the values of the residuals $r_i$, but ignores their locations $x_i$ in attribute space. The method of the present invention calculates reliability measures that are sensitive not only to the residual values but also to the locations of the training data point attribute vectors in attribute space.

In the method of the present invention, the training point triplets, that is, the training data points and their residuals, $(x_i, z_i, r_i)$, i=1, . . . , N, are considered as N pieces of evidence from which to evaluate the reliability in a predicted value $\hat{z}$. The Dempster-Shafer theory of evidence is used to aggregate uncertainties on the predicted value $\hat{z}$ from each training point triplet $(x_i, z_i, r_i)$, i=1, . . . , N. The Dempster-Shafer theory of evidence is described in Dempster, A. P., "Upper and Lower Probabilities Induced by Multivalued Mapping", Annals Math. Statistics, Vol. 38, No. 2, p. 325–339, 1987 and Shafer, G., *A Mathematical Theory of Evidence*, Princeton University Press, 1976.

In classical probability theory, the sample space of hypotheses consists of all the standard hypotheses: $H_0$ and $H_1$ as given in equations (4a) and (4b). In Dempster-Shafer theory, the sample space of standard hypotheses is enlarged to include all possible subsets of the set of standard hypotheses. This enlarged set of hypotheses is called a frame of discernment $\theta=\{H_k\}$. In our case, one more hypothesis is needed:

$$H_\theta = H_0 \text{ -or- } H_1. \qquad (4c)$$

Here the notation $H_0$ -or- $H_1$ means that $H_0$ and $H_1$ cannot be distinguished. Hypothesis $H_\theta$ is related to a notion of unpredictability of the predicted value $\hat{z}$. Thus, in our case, the frame of discernment $\theta=\{H_0, H_1, H_\theta\}$. A frame of discernment in Dempster-Shafer theory is a generalization of a sample space of standard hypotheses in conventional probability theory.

The hypothesis $H_\theta$ represents noncommitment to either $H_0$ or $H_1$. In this expanded hypothesis set, the impact of a piece of evidence on each hypothesis is represented by a function $m(H_k)$ called a basic probability assignment. For each piece of evidence represented by a training data triplet $(x_i, z_i, r_i)$, the sum of the basic probability assignments assigned to all three hypotheses, $H_0$, $H_1$, and $H_\theta$, becomes unity. Thus, for each i=1, . . . , N, $$m_i(H_0)+m_i(H_1)+m_i(H_\theta)=1 \qquad (5)$$

This framework provides a means to represent lack of relevant information associated with each piece of evidence by the basic probability assignment $m_i(H_\theta)$. The smaller the value of $m_i(H_\theta)$, the more definite the information on $H_0$ or $H_1$.

The present invention quantifies reliability associated with a predicted value in terms of the values of three reliability measures. These measures are termed reliability, unreliability, and unpredictability, and are associated with the hypotheses given in equations (4a), (4b), and (4c), respectively. Further, equation (5) dictates that the values of the measures add up to one for each i=1, . . . , N. The complement of unpredictability, (1−unpredictability), measures the degree with which the predicted value is supported by the training data points. This concept is not available in the standard confidence interval approach.

In our case, each basic probability distribution $m_i(z)$ is the likelihood of a dependent variable z being evidenced by an observation of a training data triplet $(x_i, z_i, r_i)$. This $i^{th}$ observed training data triplet provides valuable information in that the predicted value $\hat{z}_i$ at $x_i$ misses the true value $z_i$ by its residual $r_i$. It is assumed that the ith training data triplet $(x_i, z_i, r_i)$ will predict that the probability distribution of the true value z at x will have a mean value of $(\hat{z}+r_i)$. It is also assumed that the prediction power of the $i^{th}$ training data triplet as a piece of evidence concerning z will diminish as the distance between the two attribute vectors x and $x_i$ increases. Thus, a normalized distance $d_i$, for i=1, . . . , N, between attribute vectors x and $x_i$ is defined by:

$$d_i = \sqrt{\sum_{j=1}^{J} (x_j^n - x_{i,j}^n)^2 / J} \qquad (6)$$

where $x_j^n=100(x_j/(x_j^{max}-x_j^{min}))$, and $x_{i,j}^n=100(x_{i,j}/(x_j^{max}-x_j^{min}))$.

Here $x_j$ and $x_{i,j}$ are the $j^{th}$ element of the attribute vectors x and $x_i$, respectively, $x_j^{max}$ and $x_j^{min}$ are the maximum and minimum values, respectively, of the $j_{th}$ attribute element for the whole training data set, $x_j^n$ and $x_{i,j}^n$ are normalized attribute elements, and J is the dimension of the attribute vector x. The basic probability assignment on $H_\theta$, $m_i(H_\theta)$, will increase as $d_i$ increases.

It is further assumed that the basic probability distribution of the dependent variable z takes the form of a normal distribution. Based on the notation described above, a basic probability distribution $m_i(z)$, as evidenced by the $i_{th}$ training data triplet $(x_i, z_i, r_i)$, is defined as:

$$m_i(z)=\theta^c(d_i)\aleph(\hat{z}+r_i,\sigma) \qquad (7a)$$

for i=1, ..., N, where $$\theta^c(d_i)=1-(d_i/d_{max}) \text{ for } d_i<d_{max}=0 \text{ for } d_i \geq d_{max}. \tag{7b}$$

Here $\theta^c(d_i)$ is the prediction power of the $i^{th}$ training data triplet $(x_i, z_i, r_i)$, $d_{max}$ is the maximum prediction distance, and $\aleph(\hat{z}+r_i,\sigma)$ represents a normal distribution over z with mean $(\hat{z}+r_i)$ and a standard deviation $\sigma$. In equations (7a) and (7b), the parameters $\sigma$ and $d_{max}$ are not yet known and must be appropriately determined, as will be described below.

With the formulations given above, the basic probability assignments of the hypotheses from the evidence given by the $i^{th}$ training data triplet $(x_i, z_i, r_i)$, i=1, ..., N, are computed as follows:

$$m_i(H_0) = m_i\left(|Z - \hat{Z}| \leq \gamma\right) = \int_{\hat{Z}-\gamma}^{\hat{Z}+\gamma} m_i(z)\,dz \tag{8a}$$

$$m_i(H_1) = m_i\left(|Z - \hat{Z}| > \gamma\right) = \int_{-\infty}^{\hat{Z}-\gamma} m_i(z)\,dz + \int_{\hat{Z}+\gamma}^{+\infty} m_i(z)\,dz \tag{8b}$$

$$m_i(H_\theta)=1-\theta^c(d_i)=1-m_i(H_0)-m_i(H_1) \tag{8c}$$

Here $m_i(H_\theta)$ represents the amount of belief not committed to either hypothesis $H_0$ or $H_1$. The above three quantities defined in basic probability assignment equations (8a), (8b), and (8c) are termed $\gamma$-level reliability, $\gamma$-level unreliability, and unpredictability, respectively.

Dempster-Shafer theory has a formal process, called the rule of combination, to combine individual basic probability assignments induced by independent evidence. If $m_1$ and $m_2$ are two basic probability assignments from two pieces of evidence, and $A_i$ and $B_j$ are hypotheses induced by the two evidences, then a combined basic probability assignment $m_1 \oplus m_2$ (C) for a hypothesis C is computed as:

$$m_1 \oplus m_2(C) = (1/K) \sum_{A_i \cap B_j = C} m_1(A_i) m_2(B_j) \tag{9}$$

where K is a normalization factor defined by:

$$K = 1 - \sum_{A_i \cap B_j = \phi} m_1(A_i) m_2(B_j)$$

and $\phi$ is the null set. The combination is designated by the orthogonal sum operation $\oplus$.

For the specific case of hypotheses $H_0$, $H_1$, and $H_\theta$, we have $$H_0 = H_0 \cap H_0 = H_0 \cap H_\theta,$$

$$H_1 = H_1 \cap H_1 = H_1 \cap H_\theta,$$

$$H_\theta = H_\theta \cap H_\theta, \text{ and}$$

$$\phi = H_0 \cap H_1.$$

Then, the rule of combination in equation (9) becomes:

$$m_1 \oplus m_2(H_0) = [m_1(H_0)m_2(H_0) + m_1(H_0)m_2(H_\theta) + m_2(H_0)m_1(H_\theta)]/K,$$

$$m_1 \oplus m_2(H_1) = [m_1(H_1)m_2(H_1) + m_1(H_1)m_2(H_\theta) + m_2(H_1)m_1(H_\theta)]/K,$$

and $$m_1 \oplus m_2(H_\theta) = m_1(H_\theta)m_2(H_\theta)/K$$

with normalization factor K defined by:

$$K=1-m_1(H_0)m_2(H_1)-m_1(H_1)m_2(H_0)$$

The commutative property of multiplication ensures that this rule yields the same value regardless of the order in which basic probability assignments are combined. In the present invention, the total belief on a hypothesis is computed by combining the N basic probability assignments from the N training data triplets. In the present case, this gives:

$$\text{Bel}(H_0)=m_1 \oplus m_2 \oplus \ldots \oplus m_n(H_0), \tag{10a}$$

$$\text{Bel}(H_1)=m_1 \oplus m_2 \oplus \ldots \oplus m_n(H_1), \text{ and} \tag{10b}$$

$$\text{Bel}(H_\theta)=m_1 \oplus m_2 \oplus \ldots \oplus m_n(H_\theta). \tag{10c}$$

Belief Bel $(H_k)$, for k=0, 1, and 0, may be interpreted as the total support that is attributed to the hypothesis $H_k$ by the evidence from all N training data triplets.

Belief equations (10a)–(10c) define the three reliability measures of the present invention. Reliability is defined by Bel $(H_0)$ in equation (10a), unreliability is defined by Bel $(H_1)$ in equation (10b), and unpredictability is defined by Bel $(H_\theta)$ in equation (10c). By their construction, these three reliability measures have the following characteristics for a prediction point x. Reliability, Bel $(H_0)$, will be large if the attribute vector x is near the vicinity of some of the training data point attribute vectors $x_i$ and the residuals $r_i$ at these nearby training data points are small. Unreliability, Bel $(H_1)$, will be large if the attribute vector x is near the vicinity of some of the training data point attribute vectors $x_i$ and the residuals $r_i$ at the nearby training data points are large. Unpredictability, Bel $(H_\theta)$, will be large if the attribute vector x has only a few or no training data point attribute vectors $x_i$ in its vicinity.

The lower part of FIG. 1 shows 10 training data points 100 and the linear prediction line 102, in which the horizontal axis 104 represents the attribute vector x of one dimension and the vertical axis 106 represents the predicted variable z. The upper part of FIG. 1 displays the three reliability measures computed for the prediction line. These measures are reliability 108, unreliability 110 and unpredictability 112. One can observe the three characteristics described above in this plot. A comparison of three reliability measures identifies regions of high reliability 114 or low reliability 116 on the predicted values. It also indicates regions 118 where poorly constrained extrapolation or interpolation might occur, which is signified by a high unpredictability value. In this example, the regions of high reliability 114 or high unpredictability 118 are relatively easy to identify visually without the help of reliability measures, because the attribute vector has only one element or dimension. However, when the dimension of an attribute vector becomes greater than two, this type of visual analysis becomes very difficult.

In the present invention, three parameters affect the quantification of the three reliability measures. With reference to equations (7) and (8), the choices of parameter values for prediction error level $\gamma$, standard deviation $\sigma$, and maximum prediction distance $d_{max}$ will result in different values for the reliability measures. The following discusses effects of these parameters and establishes a preferred procedure for determining an optimal set of values for them. However, other methods for determining the parameter values are within the scope of the present invention.

First, an appropriate value for prediction error level $\gamma$ is determined. The parameter $\gamma$ defines the amount of prediction error one is willing to allow in the definition of $\gamma$-level reliability or γ-level unreliability in basic probability assignment equations (8a) and (8b). If γ is unreasonably large, then all γ-level reliabilities will tend to have high values. Conversely, if γ is too small, then all γ-level reliabilities will tend to have low values. Therefore, improper choice of γ will hamper the resolution of reliability measures, even though the relative magnitudes will still have meaning.

A sample variance $\sigma_t^2$ of the residuals $r_i$ from the set of N training data triplets is defined as:

$$\sigma_t^2 = \sum_{i=1}^{N} r_i^2 / (N-1) \quad (11)$$

If one would like to assess the prediction reliability as compared to one sample standard deviation of the residuals of the training data triplets, the preferred embodiment would be to set the prediction error level γ to $$\gamma = \sigma_t \quad (12)$$

Alternatively, if a limit on acceptable error tolerance exists, such as 5 porosity units for predicted porosities, then an alternative embodiment would be to set the prediction error level y to the error tolerance limit, such as 5 in our example.

Next, a range of acceptable values for the standard deviation a is determined. In basic probability distribution equations (7a) and (7b), $\sigma^2$ is the variance of the quantity $z-(\hat{z}+r_i)$, which can be expanded into:

$$z-(\hat{z}+r_i)=(z-\hat{z})-(z_i-\hat{z}_i) \quad (13)$$

Without assuming certain statistical properties for the residuals, such as constant variance or correlation structure of residuals, the variance of the quantity in equation (13) cannot be estimated. Therefore, a constant variance of residuals is assumed to find an approximate range of values for σ. If the statistical prediction model $\hat{z}=\hat{f}(x)$ describes the underlying relationship between attribute vector x and dependent variable z fairly well everywhere, then variance $\text{Var}(z-\hat{z})$ will be the same as variance $\text{Var}(z_i-\hat{z}_i)$. If it can further be assumed that the residuals $(z-\hat{z})$ and $(z_i-\hat{z}_i)$ are uncorrelated, then $$\sigma^2=\text{Var}(z-(\hat{z}+r_i))=\text{Var}((z-\hat{z})-(z_i-\hat{z}_i))=\text{Var}(z-\hat{z})+\text{Var}(z_i-\hat{z}_i)\approx 2\sigma_t^2 \quad (14)$$

On the other hand, if it is assumed that the residuals $(z-\hat{z})$ and $(z_i-\hat{z}_i)$ are positively correlated, that is, the values of the residuals are not random, then $$\sigma^2 < 2\sigma_t^2 \quad (15)$$

The assumption in a conventional statistical analysis is that the residuals are completely uncorrelated, implying that one could set $\sigma^2=2\sigma_t^2$. In general, however, a should be set to a value less than $\sqrt{2}\sigma_t$ if correlations exist among the residuals. This determines a range of values for the standard deviation σ.

If an unreasonably high value is chosen for the standard deviation σ, then the normal distribution in basic probability distribution equations (7a) and (7b) flattens, resulting in loss of distinction between reliability and unreliability measures. Conversely, if σ is too small, then the contrast between reliability and unreliability measures will be exaggerated. In either case, results are less desirable, although still meaningful.

Next, a range of acceptable values for the maximum prediction distance $d_{max}$ is determined. In basic probability distribution equations (7a) and (7b), the prediction power, $\theta^c_{(di)}$, of the $i^{th}$ piece of evidence on the true value z is a function of $d_{max}$. The prediction power of $\theta^c(d_i)$ becomes 1 when the distance $d_i$ is zero and it decreases linearly to zero when $d_i=d_{max}$. Therefore, a large value of $d_{max}$ implies that prediction power of evidences reaches far in attribute space. If one believes that the residuals $(z-\hat{z})$ and $(z_i-\hat{z}_i)$ are correlated at large distances in attribute space, then $d_{max}$ should be assigned a large value, as a percentage of the maximum of the normalized attribute distances $d_i$ defined in equation (6) above. For example, a value for $d_{max}$ of 30 implies that the correlation between residuals is assumed to be zero at and beyond the 30 percent of the maximum normalized attribute distance. In the preferred embodiment, $d_{max}$ is set to a value less than 100. This determines a range of values for the maximum prediction distance $d_{max}$.

Finally, optimal values for σ and $d_{max}$ are determined within the ranges of values for σ and $d_{max}$ determined above. So far, it has been noted that the two parameters σ and $d_{max}$ should be a function of the correlation between the two residuals r and $r_i$, which may not be constant and is difficult to estimate with a limited number of training data points. For a given value of γ, the parameters σ and $d_{max}$ will be determined so as to maximize the average correlation between probabilities based on an observed residual at a training data point and γ-level reliabilities based on the rest of the observed residuals. In the present invention, random variables $z^t_i$ for i=1, ..., N are used. These random variables $z^t_i$ are defined to have a normal distribution with a mean $z_i$ and a standard deviation σ. This assumption allows one to compute the probability that the random variable $z^t_i$ is between $\hat{z}_i+\gamma$ and $\hat{z}_i-\gamma$, given the observation of $z_i$, for i=1, ..., N. This is expressed as $$P(|z_i^t-\hat{z}_i|<\gamma|z_i) \quad (16)$$

The γ-level reliability based on the restricted set of training data triplets $(x_j, z_j, r_j)$ for j=1, ..., N and j≠i, can be computed as the degree of belief that the residual between the random variable $z^t_i$ and the predicted value $\hat{z}_i$ is less than γ. This modified belief is then given by $$\text{Bel}_i'(H_0)=m_1 \oplus \ldots \oplus m_{i-1} \oplus m_{i+1} \oplus \ldots \oplus m_N(H_0) \quad (17)$$

Note that the probability in equation (16) is based on the single observed parameter value $z_i$, while the belief in equation (17) is based on the remaining observed parameter values $z_j$ for j =1, ..., N and j≠i. Further, the belief in equation (17) is a function of a and dmax, while the probability in equation (16) is independent of σ and $d_{max}$.

Now, for fixed values of σ and $d_{max}$, the average of the correlation coefficients between the probabilities from equation (16) and the γ-level reliabilities from equation (17) for i=1, ..., N, is computed as:

$$\rho(\sigma, d_{\max}) = \frac{1}{N}\sum_{i=1}^{N} P(|Z_i^t - \hat{Z}_i| < \gamma|z_i)\text{Bel}_i'(H_0). \quad (18)$$

Here, the average correlation $\rho(\sigma, d_{max})$ is a function of the two parameters σ and $d_{max}$.

By knowing an approximate range of values for σ and $d_{max}$, $\sigma^2<2\sigma_t^2$ and $d_{max}<100$, the average correlation ρ in correlation equation (18) can be computed for various values of σ and $d_{max}$ with the training data points. Because the computation of the average correlation is very fast, a parameter set of σ and $d_{max}$ which maximizes the average correlation is easily found by an exhaustive search. With an appropriate value for the parameter y and optimum values for the parameters σ and $d_{max}$, equations (7) through (10) may be used to calculate the desired reliability measures.

Figure 2:
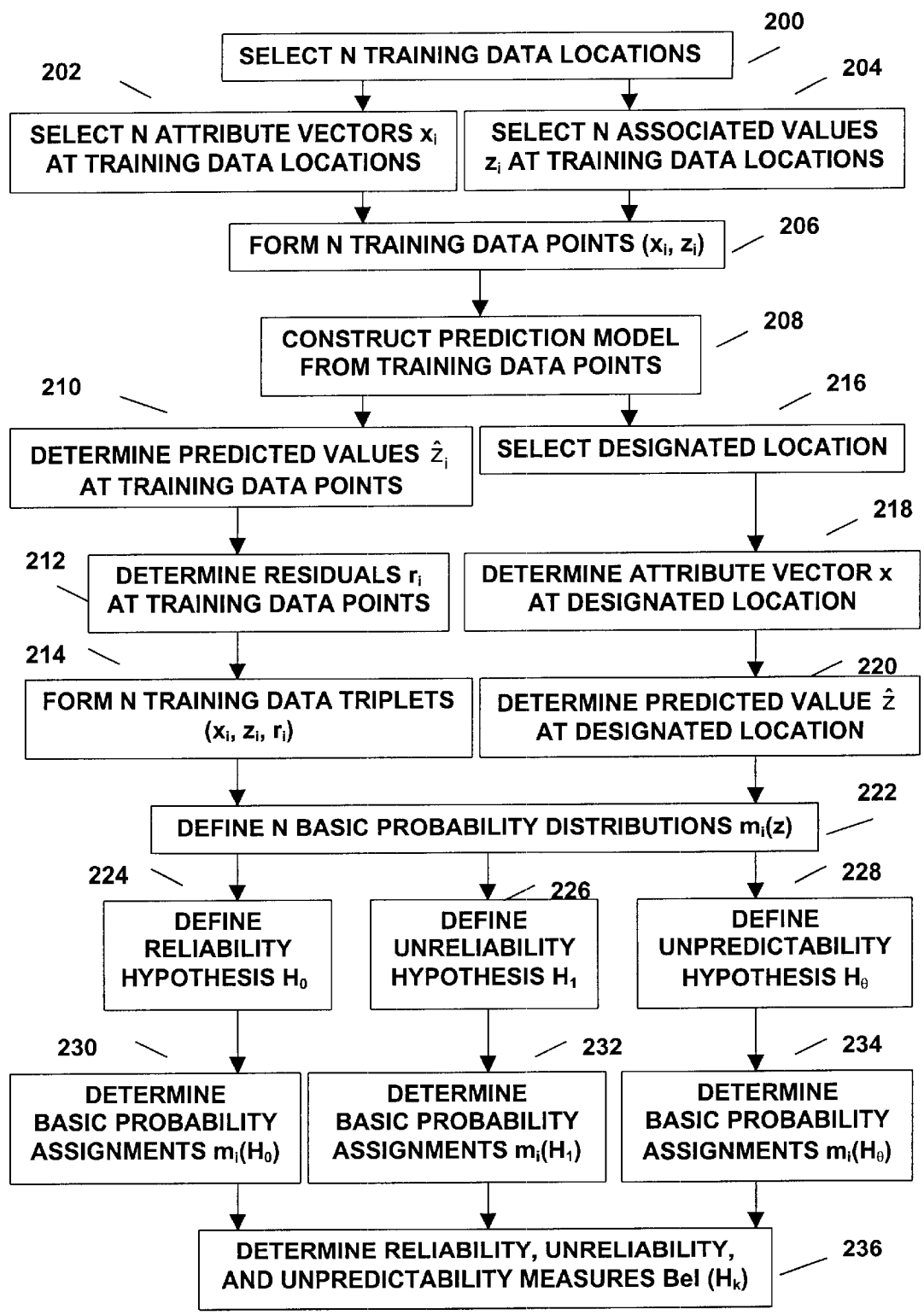
FIG. 2 is a flowchart illustrating the processing steps of one embodiment of the method of the present invention for determining reliability measures for prediction values for a specified geophysical or geological parameter from a statistical prediction model.

FIG. 2 is a flowchart which illustrates a preferred embodiment of the method of the present invention for determining reliability measures for prediction values for a specified geophysical or geological parameter from a statistical prediction model. First, at step 200, N locations for training data are selected. Preferably, the training point locations are at or near N well locations. Second, at step 202, N attribute vectors $x_i$ for i=1, ..., N are selected at the N training data locations from step 200. Preferably, these attribute vectors comprise one or more seismic attributes obtained from seismic data traces collected at or near N wells. Next, at step 204, N associated observed values $z_i$ for i=1, ..., N are selected at the N training data locations from step 200 and corresponding to the N attribute vectors from step 202. Preferably, these associated observed values are taken from well data at the N wells. Next, at step 206, these attribute vectors from step 202 and associated observed values from step 204 are combined to form N training data points $(x_i, z_i)$ for i=1, ..., N. Next, at step 208, a statistical prediction model is constructed from the N training data points from step 206. Preferably, this prediction model is constructed by multiple regression on the N training data points from step 206. However, the method of the present invention is not limited to any particular statistical prediction model. Next, at step 210, predicted values $\hat{z}_i$ for i=1, ..., N, are determined for each of the N attribute vectors $x_i$ from step 202, using the statistical prediction model from step 208. If the prediction model is defined by a function f, then $\hat{z}_i = f(x_i)$ for i=1, ..., N. Next, at step 212, residuals $r_i$ for i=1, ..., N are determined for each of the N training data points from step 206. Preferably, each of these residuals $r_i$ is defined by the difference between an associated observed value $z_i$ from step 204 for the specified parameter for the training data point and the corresponding predicted value $\hat{z}_i$ from step 210 of the specified parameter for the training data point from the statistical prediction model. Thus $r_i = z_i - \hat{z}_i$ for i=1, ..., N. Next, at step 214, the training data points $(x_i, z_i)$ for i=1, ..., N from step 206 and the residuals $r_i$ for i=1, ..., N from step 212 are combined to form N training data triplets $(x_i, z_i, r_i)$ for i=1, ..., N.

Next, at step 216, a designated location is selected. Preferably, this designated location is in an area in which the same one or more seismic attributes collected at the N training data locations in step 202 can be obtained from seismic data traces. Next, at step 218, an attribute vector x is determined at the designated location from step 216. Preferably, this attribute vector comprises the one or more seismic attributes obtained from seismic data traces collected at or near the designated location. Next, at step 220, a predicted value $\hat{z}$ of the specified parameter is determined at the designated location from step 216. Preferably, the predicted value $\hat{z}$ of the specified parameter is obtained by applying the statistical prediction model from step 208 to the attribute vector x from step 218. If the prediction model is defined by a function f, then $\hat{z} = f(x)$. Next, at step 222, N basic probability distributions $m_i(z)$ for i=1, ..., N are defined from the N training data triplets $(x_i, z_i, r_i)$ from step 214 and the predicted value $\hat{z}$ from step 220. The preferred construction of the N basic probability distributions as in equations (7a) and (7b) will be covered in more detail in the discussion of FIG. 4 below.

Lastly, the reliability measures are calculated. First, at step 224, a hypothesis $H_0$ that the predicted value $\hat{z}$ from step 220 is reliable is defined. Preferably, the hypothesis $H_0$ is defined by equation (4a), above. Similarly, at steps 226 and 228, respectively, hypotheses $H_1$ and $H_\Theta$ that the predicted value $\hat{z}$ from step 220 is unreliable and unpredictable, respectively, are defined. Preferably, the hypotheses $H_1$ and $H_\Theta$ are defined by equations (4b) and (4c), respectively, above. Next, at step 230, respectively, basic probability assignments $m_i(H_0)$ for i=1, ..., N are determined for the predicted value z from step 220 and for the hypotheses Ho from step 224, using the N training data triplets $(x_i, z_i, r_i)$ from step 214. Preferably, basic probability assignments $m_i(H_0)$ are defined by equation (8a), above. Similarly, at steps 232 and 234, respectively, basic probability assignments $m_i(H_1)$ and $m_i(H_\Theta)$ for i=1, ..., N are determined for the predicted value $\hat{z}$ from step 220 and for the two hypotheses $H_1$ and $H_\Theta$ from steps 226 and 228, respectively, using the N training data triplets $(x_i, z_i, r_i)$ from step 214. Preferably, basic probability assignments $m_1(H_1)$ and $m_1(H_\Theta)$ are defined by equations (8b) and (8c), respectively, above. Finally, at step 236, a reliability measure Bel $(H_0)$, an unreliability measure Bel $(H_1)$, and an unpredictability measure Bel $(H_\Theta)$ for the predicted value $\hat{z}$ from step 220 are determined. The reliability measure Bel $(H_0)$, unreliability measure Bel $(H_1)$, and unpredictability measure Bel $(H_\Theta)$ are determined as combinations of the N basic probability assignments $m_1(H_k)$ for i=1, ..., N and k=0, 1, and 0, from steps 230, 232, and 234. Preferably, reliability measure Bel $(H_0)$, unreliability measure Bel $(H_1)$, and unpredictability measure Bel $(H_\Theta)$ are calculated using equations (10a), (10b), and (10c), respectively.

Figure 3:
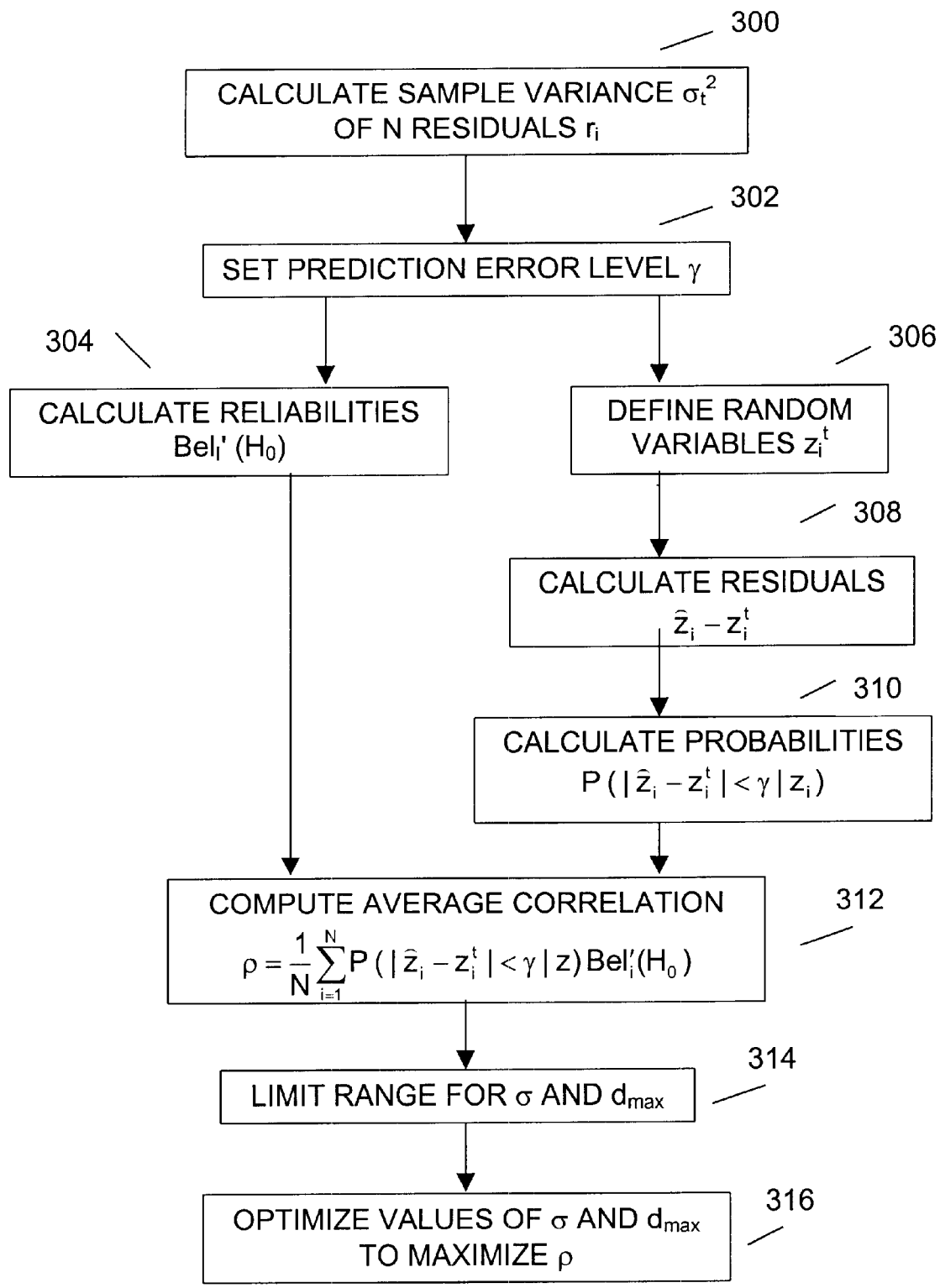
FIG. 3 is a flowchart illustrating a preferred embodiment of the method of the present invention for optimizing the prediction error level $\gamma$, standard deviation $\sigma$, and maximum prediction distance $d_{max}$ parameters.

FIG. 3 is a flowchart that illustrates a preferred embodiment of the method of the present invention for fine-tuning the prediction error level γ, standard deviation σ, and maximum prediction distance $d_{max}$ parameters. First, at step 300, a sample variance $\sigma_r^2$ is calculated for the N residuals $r_i$ from step 212 of FIG. 2. Preferably, the sample variance $\sigma_r^2$ is defined as in equation (11) above. Second, at step 302, a prediction error level γ is set. Preferably, the prediction error level γ is set equal to the sample standard deviation at from step 300. Alternatively, if a limit on error tolerance exists, then the value of γ is set equal to the error tolerance limit.

Next, at step 304, a modified γ-level reliability Bel$_i$' $(H_0)$ is calculated using the N-1 training data points $(x_j, z_j, r_j)$ for j=1, ..., N and j≠i, from step 206 of FIG. 2 and the prediction error level γ from step 302. Preferably, the modified γ-level reliability Bel$_i$' $(H_0)$ is calculated using equation (17), above. Next, at step 306, random variables $z^t_i$ are defined for i=1, ..., N. Preferably, each random variable $z^t_i$ is defined having a normal distribution with a mean equal to the associated observed value zi from step 204. The normal distribution of the random variables $z^t_i$ will each have a standard deviation σ, which will be determined below. Next, at step 308, a residual $r^t_i$ is determined for i=1, ..., N. Preferably, each residual $r^t_i$ is defined by the difference between the random variable $z^t_i$ from step 304 and the predicted value $\hat{z}_i$ from step 210 of FIG. 2. Next, at step 310, probabilities $P(|z_i^t - \hat{z}_i| < \gamma | z_i)$ are calculated for the residuals $r^t_i$ from step 308, for i=1, ..., N and the prediction error level γ from step 302. Next, at step 312, an average correlation ρ between the γ-level reliabilities from step 304 and the probabilities from step 310 are calculated. Preferably, the average correlation ρ is defined as in equation (18) above.

Next, at step 314, the ranges of the variables σ and $d_{max}$ are limited. Preferably, if the residuals are correlated, the limit on σ is given by variance inequality (15), using the sample variance $\sigma_r^2$ from step 300. Alternatively, if the residuals are uncorrelated, σ is approximated by variance approximation (14), again using the sample variance $\sigma_r^2$ from step 300. Preferably, $d_{max}$ is limited to less than 100. Next, at step 316, the values of $\sigma$ and $d_{max}$ which maximize the average correlation $\rho$ from step 312 is determined by an optimization algorithm. Preferably, the optimization algorithm is an exhaustive search over the range of limited values for $\sigma$ and $d_{max}$ from step 314.

Figure 4:
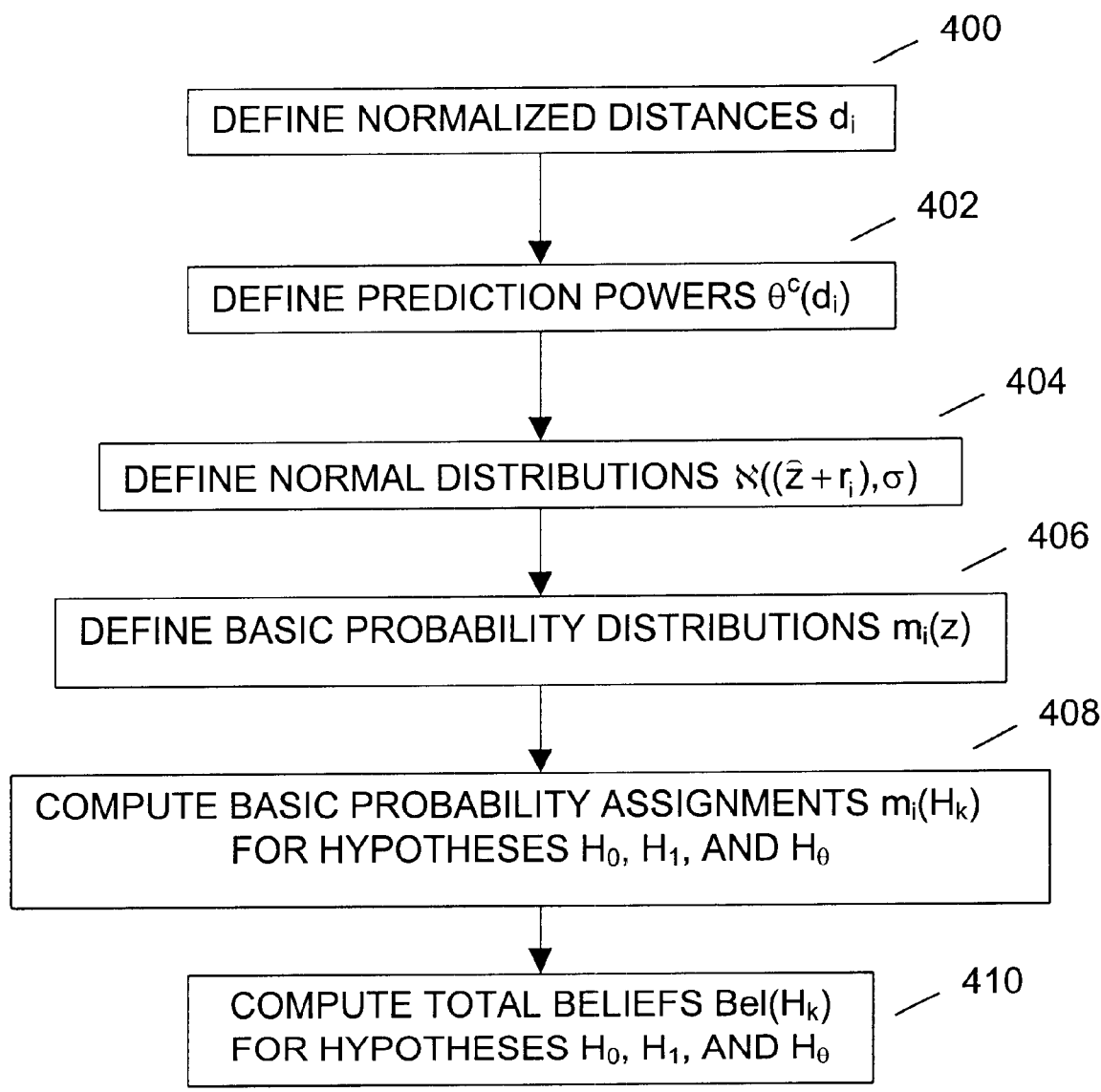
FIG. 4 is a flowchart illustrating a preferred embodiment of the method of the present invention for calculating the reliability measures from FIG. 2 using the optimized values of the prediction error level $\gamma$, the standard deviation $\sigma$, and the maximum prediction distance $d_{max}$ from FIG. 3.

FIG. 4 is a flowchart which illustrates a preferred embodiment of the method of the present invention for calculating the reliability, unreliability, and unpredictability measures in step 236 of FIG. 2, using the selected values of the prediction error level $\gamma$ from step 302 of FIG. 3 and the standard deviation $\sigma$ and maximum prediction distance $d_{max}$ from step 316 of FIG. 3. First, at step 400, a normalized distance $d_i$ for i=1, ..., N is defined for each training data point from step 206 of FIG. 2. Preferably, the normalized distance $d_i$ is defined as in normalized distance equation (6) above, using values for the attribute vectors $x_i$ and $x$ from steps 202 and 218, respectively, of FIG. 2. Next, at step 402, prediction powers $\theta^c(d_i)$ for i=1, ..., N are defined for each training data point. Preferably, the prediction powers $\theta^c(d_i)$ are defined as in equation (7b) above, using values for the normalized distance $d_i$ from step 400 and the maximum prediction distance $d_{max}$ from step 316 of FIG. 3. Next, at step 404, normal distributions $\aleph(\hat{z}+r_i)\sigma$ for i=1, ..., N are defined, based on each training data point. Preferably, these normal distributions $\aleph(\hat{z}+r_i)\sigma$ are defined with a mean of $\hat{z}+r_i$, using values for the residuals $r_i$ and the predicted value $\hat{z}$ from steps 212 and 220, respectively, of FIG. 2, and the standard deviation $\sigma$ from step 316 of FIG. 3. Then, at step 406, basic probability distributions $m_i(z)$ for i=1, ..., N are defined for each training data point. These are the basic probability distributions referred to in step 222 of FIG. 2. Preferably, the basic probability distributions $m_i(z)$ are defined by multiplying the prediction powers $\theta^c(d_i)$ from step 402 with the normal distributions $\aleph(\hat{z}+r_i)\sigma$ from step 404, as in probability equation (7a) above. Next, at step 408, basic probability assignments $m_i(H_k)$ are calculated from basic probability distributions $m_i(z)$ from step 406 for each of the hypotheses $H_0$, $H_1$, and $H_\Theta$ from steps 230, 232, and 234, respectively, of FIG. 2. Preferably, the basic probability assignments $m_i(H_0)$, $m_i(H_1)$, and $m_i(H_\Theta)$ are defined as in equations (8a), (8b), and (8c), respectively, above, using values for the predicted value $\hat{z}$ from step 220 of FIG. 2 and for the prediction error level $\gamma$ from step 302 of FIG. 3. These basic probability assignments from step 408 define $\gamma$-level reliability, $\gamma$-level unreliability, and unpredictability, respectively, as evidenced by a single training data triplet ($x_i$, $z_i$, $r_i$). Finally, at step 410, total belief is calculated for each of the hypotheses $H_0$, $H_1$, and $H_\Theta$, as a combination of the basic probability assignments from step 408. Preferably, the total beliefs Bel ($H_0$), Bel ($H_1$), and Bel ($H_\Theta$) are calculated by using the Dempster-Shafer theory rule of combination, as in equations (10a), (10b), and (10c) above. These total beliefs from step 410 define reliability, unreliability, and unpredictability measures, respectively, for a given prediction error level $\gamma$, as evidenced by the N training data triplets ($x_i$, $z_i$, $r_i$) for i=1, ..., N.

EXAMPLES

The method of the present invention is further described with the following examples. With a 3-D seismic survey, seismic data and the accompanying measured attributes are available at close intervals in the space domain. Even though well-log data in the same area may provide important geophysical or geological information, typically wells are relatively sparsely located. Geoscientists often use linear regression to establish relationships between seismic attributes and geophysical or geological properties observed at wells. This regression model, along with seismic attributes, is then used to predict the unknown geophysical or geological properties away from the wells. The first example demonstrates the value of the present invention in this type of seismic attribute calibration. Also shown in this example is a demonstration of how the parameter optimizing methods are employed.

A 100×100 synthetic seismic attribute data set, which simulates a fluvial environment, is provided, along with sand percentages at 30 well locations. In this example, four seismic attributes, named $\chi_1$, $\chi_2$, $\chi_3$, and $\chi_4$, were used to predict the sand percent:

$x=(\chi_1, \chi_2, \chi_3, \chi_4)$
$z$=sand-percent
($x_i$, $z_i$), i=1, ..., 30 available at well locations.

The linear regression model, calculated using standard least squares techniques applied to the 30 training data points, was:

$$\hat{z}=\hat{a}^T x+\hat{b} \qquad (19)$$

where
$\hat{a}^T$=(−1.512, −1.4242, −0.7811, 1.2334)
$\hat{b}^T$=171.77
$\sigma_r$=7.51 sand percentage.

Figure 5:
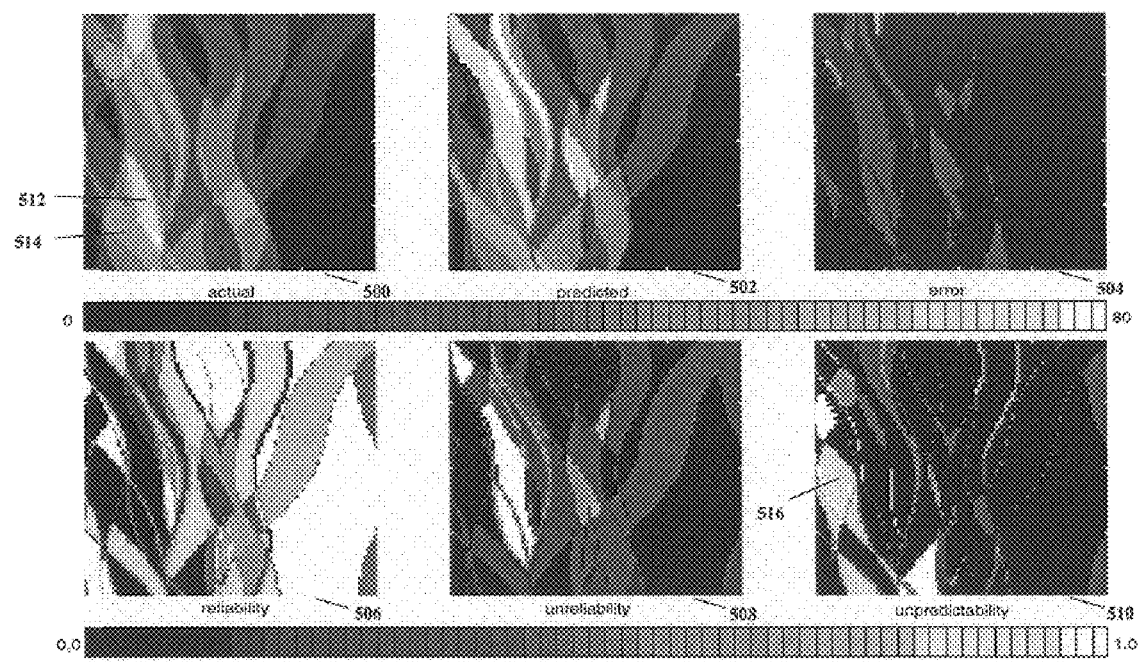
FIG. 5 illustrates the application of the method of the present invention to a synthetic data set for quantifying the reliability of predicted sand percentages at seismic locations.

The latter was calculated from residuals, using equation (11). The prediction model in model equation (19) was used to predict sand percentages at all seismic locations. The actual sand percent 500, predicted sand percent 502, and prediction error 504 are plotted in FIG. 5. In a real situation, only the predicted sand percentage map would be available because the actual sand percentages would not be known. The task of the present invention is to evaluate the reliability of the predicted sand percentages.

By following the procedure for optimal parameter selection described in conjunction with FIG. 3, $\gamma$=8 sand percentage was chosen, which is close to the sample standard deviation of the residuals of the training data points. In this case, the $\gamma$-level reliability computes the degree of belief that the difference between a true sand percentage and a predicted sand percentage is less than 8 sand percent. For a fixed value of $\gamma$=8, average correlations $\rho$ between the probabilities and the $\gamma$-level reliabilities for various values of $\sigma$ and $d_{max}$ are calculated from equation (18) and listed in Table 1.

TABLE 1

|  |  | $\sigma$ | | |
|---|---|---|---|---|
|  |  | 5 | 8 | 10 |
| $d_{max}$ | 3 | 0.420 | 0.404 | 0.392 |
|  | 6 | 0.421 | 0.406 | 0.394 |
|  | 9 | 0.432 | 0.408 | 0.390 |
|  | 12 | 0.423 | 0.390 | 0.360 |
|  | 15 | 0.354 | 0.331 | 0.284 |

In Table 1, the parameter set $\sigma$=5 and $d_{max}$=9 maximizes the average correlation.

Next, three reliability measures were computed for the rest of the seismic attribute data. The three lower maps in FIG. 5 display the degrees of reliability 506, unreliability 508, and unpredictability 510 associated with the predicted sand percentage map 502 in the middle of the upper row. In this synthetic data case, one can visually inspect how well the method determined the reliability of the predicted sand percentages by comparing the error map 504 with the three reliability maps 506, 508, and 510. It is apparent that there tend to be large errors in areas, such as 512, where unreliability measures are higher than reliability measures. Conversely, error tends to be small in areas, such as 514, where the reliability is high and the unreliability is low. Areas with high unpredictability, such as 516, indicate places where lack of training data points prohibits reliable predictions. These high unpredictability regions correspond to an area with no nearby training data points in the attribute space. This example demonstrates that the technique of the present invention can identify areas of reliable and unreliable predictions. It also identifies areas of unpredictability, which correspond to the area with no attribute training data.

In this synthetic data case, true sand percentages are known at every attribute location. To quantify how well the belief model worked, we computed the average correlation from correlation equation (18) for the whole data set. The results are shown in Table 2.

TABLE 2

|  |  | $\sigma$ | | |
|---|---|---|---|---|
|  |  | 5 | 8 | 10 |
| $d_{max}$ | 6 | 0.60 | 0.56 | 0.52 |
|  | 9 | 0.59 | 0.55 | 0.51 |

Table 2 shows that the average correlation between the probabilities from equation (16) and the reliabilities from equation (17) is 0.59 for $\gamma=8$, $\sigma=5$, and $d_{max}=9$. Because the reliability measure is most meaningful when the unpredictability measure is not high, the correlation was also calculated for only the data points at which unpredictability is less than 0.9.

TABLE 3

|  |  | $\sigma$ | | |
|---|---|---|---|---|
|  |  | 5 | 8 | 10 |
| $d_{max}$ | 6 | 0.84 | 0.77 | 0.73 |
|  | 9 | 0.83 | 0.77 | 0.73 |

Table 3 shows that the correlation is then 0.83 for $\gamma=8$, $\sigma=5$, and $d_{max}=9$. This relatively high correlation coefficient indicates that the method of the present invention is able to determine the reliability of predictions with high accuracy.

The technique of the present invention does not assume a linear relationship between the independent variables, the attributes, and the dependent variable. The present invention is model independent. Therefore, the present invention can be applied to evaluate reliabilities of nonlinear prediction results. A certain type of artificial neural network, such as a backpropagation, feedforward neural network (BPN), can be considered as a nonlinear prediction model. Even though BPN is a powerful tool for establishing a nonlinear relationship between input (attribute) and output (dependent) variables, the particular nonlinear relationship created is not apparent to the user. In a neural network application, only the elemental functional form (sigmoid) is known, not the relationship created with multiple layers of its elemental (sigmoidal) functions. Thus, in BPN applications, an additional test data set must be set aside to verify the model's performance after training is completed. Even then, the reliability of the model's prediction is unknown. Thus, the technique of the present invention will be valuable in evaluating predictions made from a BPN.

The three reliability measures derived in the present invention will provide more meaningful reliability measures than standard confidence intervals when:

(1) the training data points are clustered into groups separated by data gaps or have insufficient coverage of the attribute space,
(2) the residuals are correlated,
(3) the variance of the residuals is not constant,
(4) the dimension of the attribute space is greater than two, which makes it difficult to visualize gaps in training data points or a certain trend in residual variances, and
(5) the degree of freedom in a prediction model is greater than 8, so that the average correlation in equation (18) between the probabilities in equation (17) and the modified $\gamma$-level reliabilities in equation (17) is meaningful.

The foregoing description has been directed to particular embodiments of the invention for the purpose of illustrating the invention. It will be apparent to persons skilled in the art, however, that many modifications and variations to the embodiments described herein are possible. For example, in any of the foregoing embodiments, any statistical prediction model can be used. All such modifications and variations are intended to be within the scope of the present invention, as defined by the appended claims.

I claim:

1. A method for assessing reliability of a predicted value of a specified geological or geophysical parameter at a designated location, the predicted value obtained from a prediction model constructed from N training data attribute vectors and N associated observed values of the specified parameter; each training data attribute vector including one or more seismic attributes obtained from seismic data traces located at or near a well, each associated observed value of the specified parameter obtained from well log or core data from the well, the method comprising the steps of:

determining a predicted value of the specified parameter for each of the N training data attribute vectors, from the training data attribute vectors and the prediction model;

determining a residual for each of the N training data attribute vectors, the residual being the difference between the associated observed value of the specified parameter for the training data attribute vector and the predicted value of the specified parameter for the training data attribute vector;

determining an attribute vector for the designated location;

determining the predicted value of the specified parameter at the designated location, from the attribute vector for the designated location and the prediction model;

determining N basic probability distributions from the N training data attribute vectors, the N associated observed values, the N residuals, and the predicted value of the specified parameter at the designated location;

determining N basic probability assignments for each of three hypotheses that the predicted value of the specified parameter at the designated location is reliable, unreliable, and unpredictable, respectably, from the N basic probability distributions; and determining a reliability value, an unreliability value, and an unpredictability value for the predicted value of the specified parameter at the designated location as combinations of the N basic probability assignments for each of the hypotheses that the predicted value of the specified parameter at the designated location is reliable, unreliable, and unpredictable, respectively.

2. The method of claim 1, wherein the basic probability distributions $m_i(z)$ over the specified parameter z are defined for i=1, ..., N, by $$m_i(z)=\theta^c(d_i)\aleph((\hat{z}+r_i),\sigma),$$

wherein $\theta^c(d_i)$ is defined by $$\theta^c(d_i)=1-(d_i/d_{max}) \text{ for } d_i<d_{max}=0 \text{ for } d_i \geq d_{max},$$

wherein $d_i$ is a normalized distance between the attribute vector x for the designated location and the $i^{th}$ training data attribute vector $x_i$, $d_{max}$ is a maximum prediction distance, $\aleph((\hat{z}+r_i),\sigma)$ is a normal distribution over z with mean $(\hat{z}+r_i)$ and a standard deviation $\sigma$, $\hat{z}$ is the predicted value of the specified parameter at the designated location, and $r_i=z_i-\hat{z}_i$ is the residual for the $i^{th}$ training data attribute vector $x_i$.

3. The method of claim 2, wherein the normalized distance $d_i$ is defined for; =1, ..., N, by $$d_i = \sqrt{\sum_{j=1}^{J}(x_j^n - x_{i,j}^n)^2/J},$$

wherein $x_j^n$ and $x_{i,j}^n$ are normalized $j^{th}$ elements of the attribute vector x for the designated location and the N training data attribute vectors $x_i$, respectively, and J is the dimension of the attribute vector x.

4. The method of claim 3, wherein the normalized $j^{th}$ elements of the attribute vector x, $x_j^n$ and $x_{i,j}^n$, are defined by $$x_j^n=100(x_j/(x_j^{max}-x_j^{min})), \text{ and}$$

$$x_{i,j}^n=100(x_{i,j}/(x_j^{max}-x_j^{min}))$$

wherein $x_j$ and $x_{i,j}$ are the $j^{th}$ elements of the attribute vector x for the designated location and the N training data attribute vectors $x_i$, respectively, and $x_j^{max}$ and $x_j^{max}$ are the maximum and minimum values, respectively, of the $j^{th}$ elements of the training data attribute vectors $x_i$.

5. The method of claim 1, in which the basic probability assignments $m_i(H_k)$ are defined for i=1,..., N, and k=0, 1, and $\theta$, by $$m_i(H_0) = \int_{\hat{z}-\gamma}^{\hat{z}+\gamma} m_i(z)dz,$$

$$m_i(H_1) = \int_{-\infty}^{\hat{z}-\gamma} m_i(z)dz + \int_{\hat{z}+\gamma}^{+\infty} m_i(z)dz, \text{ and}$$

$$m_i(H_\theta)=1-m_i(H_0)-m_i(H_1),$$

wherein $H_0$, $H_1$, and $H_\theta$ are the hypotheses that the predicted value of the specified parameter at the designated location is reliable, unreliable, and unpredictable, respectively, $m_i(z)$ are the N basic probability distributions, $\hat{z}$ is the predicted value of the specified parameter at the designated location, and $\gamma$ is a prediction error level.

6. The method of claim 5, wherein the reliability value Bel $(H_0)$, the unreliability value Bel $(H_1)$, and the unpredictability value Bel $(H_\theta)$ are calculated by $$\text{Bel }(H_0)=m_1 \oplus m_2 \oplus \ldots \oplus m_N(H_0),$$

$$\text{Bel }(H_1)=m_1 \oplus m_2 \oplus \ldots \oplus m_N(H_1), \text{ and}$$

$$\text{Bel }(H_\theta)=m_1 \oplus m_2 \oplus \ldots \oplus m_N(H_\theta),$$

respectively, wherein $\oplus$ represents Dempster-Shafer theory's rule of combination.

7. The method of claim 6, wherein $$\text{Bel }(H_0)+\text{Bel }(H_1)+\text{Bel }(H_\theta)=1.$$

8. The method of claim 5, further comprising the steps of:
calculating a sample standard deviation $\sigma_r$ for the N residuals; and
setting the prediction error level $\gamma$ equal to the sample standard deviation $\sigma_r$.

9. The method of claim 5, further comprising the steps of:
selecting an error tolerance limit; and
setting the prediction error level $\gamma$ equal to the error tolerance limit.

10. The method of claim 2, further comprising the steps of:
defining a random variable $z_i^t$ having a normal distribution with a mean $z_i$ and the standard deviation $\sigma$, for i=1, ..., N;
calculating a modified $\gamma$-level reliability $\text{Bel}_i'$ $(H_0)$, for i=1,..., N, based on a restricted set of the training data triplets $(x_j, z_j, r_j)$ with j=1, ..., N and j≠i;
calculating a probability $P(|z_i^t-\hat{z}_i|<\gamma|z_i)$, for i=1, ..., N;
calculating an average correlation between the modified $\gamma$-level reliabilities $\text{Bel}_i'$ $(H_0)$ and the probabilities $P(|z_i^t-\hat{z}_i|<\gamma|z_i)$; and
determining the values of the standard deviation $\sigma$ and the maximum prediction distance $d_{max}$, which maximize the average correlation by an optimization algorithm.

11. The method of claim 10, wherein the modified $\gamma$-level reliability $\text{Bel}_i'$ $(H_0)$ is defined by $$\text{Bel}_i'(H_0)=m_1 \oplus \ldots \oplus m_{i-1} \oplus m_{i+1} \oplus \ldots \oplus m_N(H_0).$$

12. The method of claim 10, wherein the average correlation $\rho$ is defined by $$\rho(\sigma, d_{max}) = \frac{1}{N}\sum_{i=1}^{N} P\left(\left|z_i^t - \hat{z}_i\right| < \gamma | z_i\right) \text{Bel}_i'(H_0).$$

13. The method of claim 10, wherein the optimization algorithm is an exhaustive search.

* * * * *